United States Patent [19]
Goossen

[11] Patent Number: 5,838,484
[45] Date of Patent: Nov. 17, 1998

[54] MICROMECHANICAL OPTICAL MODULATOR WITH LINEAR OPERATING CHARACTERISTIC

[75] Inventor: Keith Wayne Goossen, Aberdeen, N.J.

[73] Assignee: Lucent Technologies Inc., Murray Hill, N.J.

[21] Appl. No.: 699,374

[22] Filed: Aug. 19, 1996

[51] Int. Cl.⁶ ....................................................... G02F 1/09
[52] U.S. Cl. ........................... 359/282; 359/290; 359/289; 359/286
[58] Field of Search ..................................... 359/282, 290, 359/289, 286

[56] References Cited

U.S. PATENT DOCUMENTS

| 5,646,772 | 7/1997 | Yurke | 359/290 |
| 5,659,418 | 8/1997 | Yurke | 359/290 |

Primary Examiner—Frank G. Font
Assistant Examiner—Reginald A. Ratliff

[57] ABSTRACT

A micromechanical optical modulator having a linear response in reflectivity, as a function of applied bias, and a method of operating and making same, are disclosed. The modulator consists of a movable layer suspended over a substrate. A gap is defined between the movable layer and the substrate. As the movable layer moves, the gap changes size, resulting in a change in modulator reflectivity. In operation, the movable layer moves within a linear operating regime under the action of an applied voltage, which is the sum of a constant bias and a signal from an analog source. A substantially linear operating characteristic, i.e., reflectivity versus applied voltage is obtained within the linear operating regime by properly selecting the size of the gap in the absence of the applied voltage and the range in the applied voltage.

21 Claims, 7 Drawing Sheets

MICROMECHANICAL OPTICAL MODULATOR WITH LINEAR OPERATING CHARACTERISTIC

FIELD OF THE INVENTION

The present invention relates generally to improved micromechanical optical modulators.

BACKGROUND OF THE INVENTION

Micromechanical optical modulators can be used in optical communications systems for encoding information onto optical signals. While a variety of modulator designs have been proposed, most include a movable layer, often a membrane, that is suspended over a stationary layer. Typically, the movable layer and the stationary layer are conductive, so that a voltage may be applied to both layers. The applied voltage generates an electrostatic force that causes the membrane to move, from an unbiased position, toward the stationary layer. As the position of the membrane changes relative to the stationary layer, an optical property of the device changes. Such a change can be exploited to cause a change in a measurable property of an optical signal returned from the modulator. For example, the changed property of the device may be its reflectivity, and the measureable property of the signal may be its intensity. In this manner, the optical signal can be modulated, and information encoded thereon.

Typically, the response curve of the modulator, i.e., applied voltage versus modulator reflectivity, is nonlinear over the modulator's operating range. In digital applications, such nonlinearity is unimportant. In analog applications, however, a linear operating characteristic is desirable. Analog applications include, for example, cable television, standard telephony and radio applications.

As such, there is a need for a micromechanical optical modulator having a linear operating characteristic over its operating range.

SUMMARY OF THE INVENTION

A micromechanical optical modulator having a linear response in reflectivity, as a function of applied voltage, and methods for operating and making same, are disclosed. The modulator consists of a movable layer suspended over a substrate. A gap is defined between the movable layer and the substrate. As the movable layer moves under the action of an applied voltage, the size of the gap decreases. The change in the gap size results in a change in the reflectivity of the modulator. A substantially linear operating characteristic, i.e., reflectivity versus applied voltage, is obtained and maximized, by properly selecting the size of the unbiased gap and the distance that the movable layer moves under bias.

According to the invention, the modulator operates in a regime in which the incremental change in modulator reflectivity decreases as the gap size decreases, and in which the magnitude of the reflectivity increases as the gap size decreases. In embodiments in which the refractive index, $n_s$, of the substrate is 3.5, typical of silicon, the optimum size of unbiased gap is about 0.919 times the wavelength, $\lambda$, of the optical signal being modulated. The optimum gap varies as a function of substrate refractive index, the relationship between the refractive index of the movable layer and the substrate, and the thickness of the membrane.

To design and fabricate the present modulator, the reflectivity response of the modulator is expressed as a function of applied voltage. The second derivative of the reflectivity versus applied voltage expression is obtained. Since an expression is linear where its second derivative equals zero, a substantially linear operating region can be defined using the second derivative. A "nonlinearity" threshold is applied to the second derivative, for example, $-1 <$ second derivative $< +1$, so that values of the second derivative between the threshold values define, in terms of an applied voltage, a substantially linear operating range. Modulator reflectivity at the threshold values is determined from the reflectivity versus applied voltage expression. A linear operating range is defined as the reflectivity at the positive threshold minus the reflectivity at the negative threshold. The linear operating range varies as a function of the size of the gap in the unbiased position, and thus can be maximized by appropriately selecting the size of the unbiased gap. Optimum unbiased gap size is determined by expressing the linear reflectivity range determined above as a function of the difference between the unbiased gap and the gap for zero reflectivity.

In operation, a voltage is applied to the modulator. The voltage is the sum of a constant, e.g., d.c. bias, and a low voltage signal from an analog source. The constant bias moves the membrane to a bias point, at which point the gap results in a reflectivity which corresponds to an inflection point of the reflectivity versus voltage curve. The bias point is thus at the center of the linear operating range. Changes in the applied voltage due to changes in the low voltage signal move the membrane in either direction from the bias point. The magnitude of the low voltage signal is controlled to keep the modulator membrane within the linear operating range. In this manner, changes in modulator reflectivity faithfully track the signal from the analog source.

BRIEF DESCRIPTION OF THE DRAWINGS

Further features of the invention will become more apparent from the following detailed description of specific embodiments thereof when read in conjunction with the accompanying drawings, in which like elements have like reference numerals and in which.

DETAILED DESCRIPTION

Figure 1:
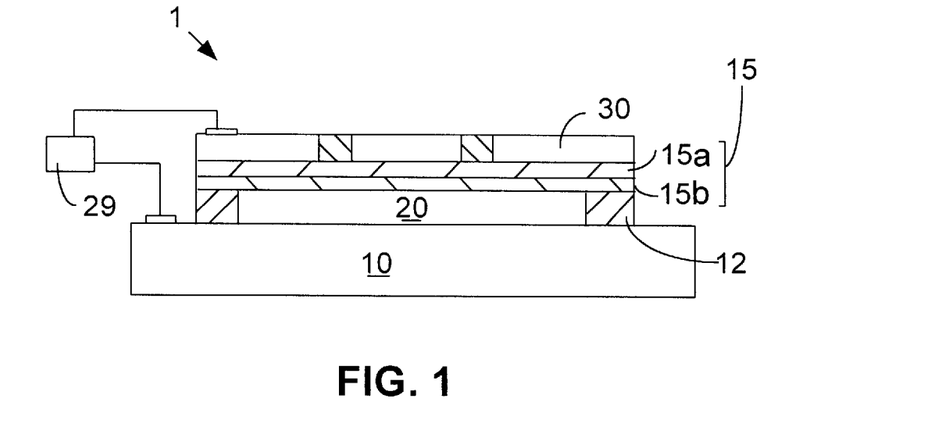
FIG. 1 is a cross-sectional side view, through the line A—A in FIG. 2, of an exemplary optical modulator according to the present invention.
Figure 2:
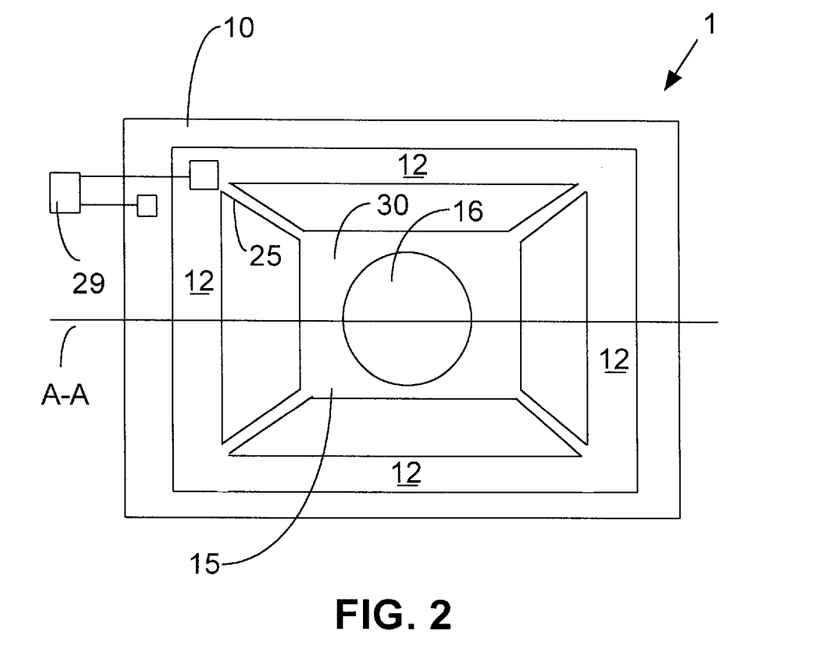
FIG. 2 is a top view of the exemplary modulator of FIG. 1.

As shown in FIG. 1, which is a cross-sectional view through line A—A in FIG. 2, a modulator 1 according to the present invention comprises a substrate 10 and a movable layer or membrane 15 that are spaced from each other defining a gap 20. As shown in FIG. 2, which is a plan view of the modulator 1, the membrane 15 is suspended over the substrate 10 by support arms 25. The supports arms 25 are in turn supported by a nonconductive support layer 12. In other embodiments, discrete support arms 25 are not present. Rather, the membrane 15 itself overlaps the nonconductive support layer 12. An example of a modulator having a membrane that overlaps the support layer is provided in Ser. No. 08/565,453 filed Feb. 1, 1996, and assigned to the present assignee. That application, and all other publications mentioned in this specification are incorporated by reference herein.

Figure 3:
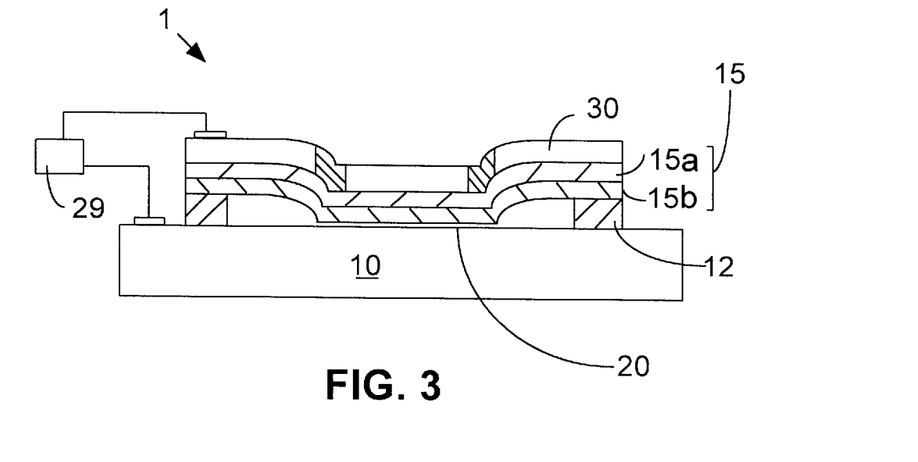
FIG. 3 shows the exemplary modulator of FIGS. 1 & 2 in a biased state.

The electrically isolated membrane 15 and the substrate 10 are electrically connected to a bias source 29, such as a battery. The voltage applied to the modulator is the sum of the bias from the bias source, as well as a low voltage signal from an analog source, not shown. Applying the voltage to the membrane 15 and substrate 10 generates an electrostatic force that moves the membrane 15 from its "unbiased" or "quiescent" position toward the substrate 10. A biased modulator is shown in FIG. 3. As the membrane 15 moves, the size of the gap 20 changes, resulting in a change in the reflectivity of the modulator 1. Such a change in reflectivity alters the measured amplitude of an optical signal reflected from the modulator. The changing reflectivity of the modulator I may thus be used to modulate an optical signal.

In typical modulators, the bias is "on" or "off," and the membrane 15 moves between a first "unbiased" position and a second "biased" positioned. Such operation is essentially digital. In the present invention, however, which is directed toward analog operation, membrane position is a function of the bias, as well as the additional small voltage signal. The membrane 15 moves through a plurality of positions within a linear operating regime substantially tracking the amplitude of the small voltage signal. The operation of the present modulator will be described in more detail later in this specification.

Preferably, the substrate 10 is a conductive material that is either transparent or absorbing over the operating optical bandwidth. Suitable materials include, without limitation, silicon, germanium, gallium arsenide, indium phosphide, and indium tin oxide (ITO) coated glass. If the substrate is a semiconductor, it should preferably be appropriately doped to enhance device speed. For example, if the substrate is silicon, it is preferably doped with any Group III or Group V element, typically phosphorous or boron. Those skilled in the art are familiar with such techniques.

If the substrate is a material that is insufficiently conductive for a modulator according to the present invention, conductivity can be increased or imparted by suitably doping the substrate 10. Doping methods include ion implantation, selective diffusion and other methods known to those skilled in the art.

The membrane 15 is comprised of at least one layer 15b, and preferably a second layer 15a. The layer 15b, in conjunction with the substrate 10 control the optical properties of modulator 1. The optional layer 15a functions as a strained layer for tailoring mechanical properties, i.e., stress, in the membrane 15.

The thickness of the layer 15b is preferably one-quarter of a wavelength, λ, of the optical signal being processed, as measured in the layer 15b. If the modulator processes an optical signal consisting of a plurality of wavelengths, the thickness of the layer 15b is one-quarter of the center wavelength of the operating optical bandwidth.

Moreover, in preferred embodiments, the layer 15b has a refractive index, $n_u$, that is about equal to the square root of the refractive index, $n_s$, of the substrate 10. The layer 15b must be transparent to the optical signal being modulated. Suitable materials for the layer 15b include, without limitation, silicon oxide, polysilicon, or, more preferably, silicon nitride.

It should be appreciated that the refractive index of the underlayer 15b may have to be specifically tailored to satisfy $n_u = n_s^{0.5}$. Methods for tailoring the refractive index of materials, such as silicon nitride, are known to those skilled in the art. See, for example, Walker et al., "Gas Composition Dependence of Silicon Nitride Used as Gallium Diffusion Barrier During GaAs Molecular Beam Epitaxy Growth on Si Complementary Metal Oxide Semiconductor," v.23 (10) J. Elec. Mat., pp. 1081–83 (1994).

Since the preferred material for the layer 15b is silicon nitride, which is nonconductive, conductivity must be provided to the membrane by either the optional layer 15a, which can be located above or below the layer 15b, or by an additional conductive layer 30 that can be disposed on the uppermost layer of the membrane 15. The layer 15a must be transparent over the operating bandwidth, and have a refractive index about equal to that of the substrate 10. In preferred embodiments, polysilicon is used for the layer 15a. If the layer 15a is formed of polysilicon, an additional conductive layer 30 is not required since polysilicon is conductive. If a conductive layer 30 is required, it may be formed of metal, such as gold, or other suitably conductive materials. If the layer 30 is not transparent to the optical signal, then an optical window 16 must be provided through the layer 30.

Micromechanical modulators having some of the features of the present modulator have been described in a prior patent and prior patent applications by the present inventor and others, such as, for example, the modulators described in U.S. Pat. Nos. 5,500,761, 5,654,819; 5,589,974; 5,659, 418; 5,646,772 and in patent application Ser. No. 08/565, 453 filed Feb. 1, 1996. Some embodiments of the modulators described therein included membranes characterized by quarter-wavelength layers and further characterized by a layer having a refractive index about equal to the square root of the refractive index of the substrate. For such modulators, relative reflectivity maxima are encountered when the gap 20 is equal to odd integer multiples of one-quarter of the operating wavelength, i.e., mλ/4 where m=1, 3, 5 . . . . Furthermore, such modulators will exhibit relative reflectivity minima when the gap 20 is 0 or an even integer multiple of one-quarter of the operating wavelength, i.e., mλ/4 where m=0, 2, 4 . . . . Thus, the best contrast is obtained when, in one state of the modulator, i.e., biased or unbiased, the gap 20 results in a reflectivity minima, and in the other state, the gap 20 results in a reflectivity maxima. Thus, the gap 20 changes by an amount λ/4 under bias.

The characteristic reflectivity versus applied voltage response of the above-described micromechanical modulators is, overall, nonlinear between relative reflectivity minima and maxima. For analog applications, it would be desirable to obtain a more nearly linear reflectivity versus drive voltage relationship. Modulators according to the present invention are designed and operated to provide a linear operating range, as described below.

Figure 4:
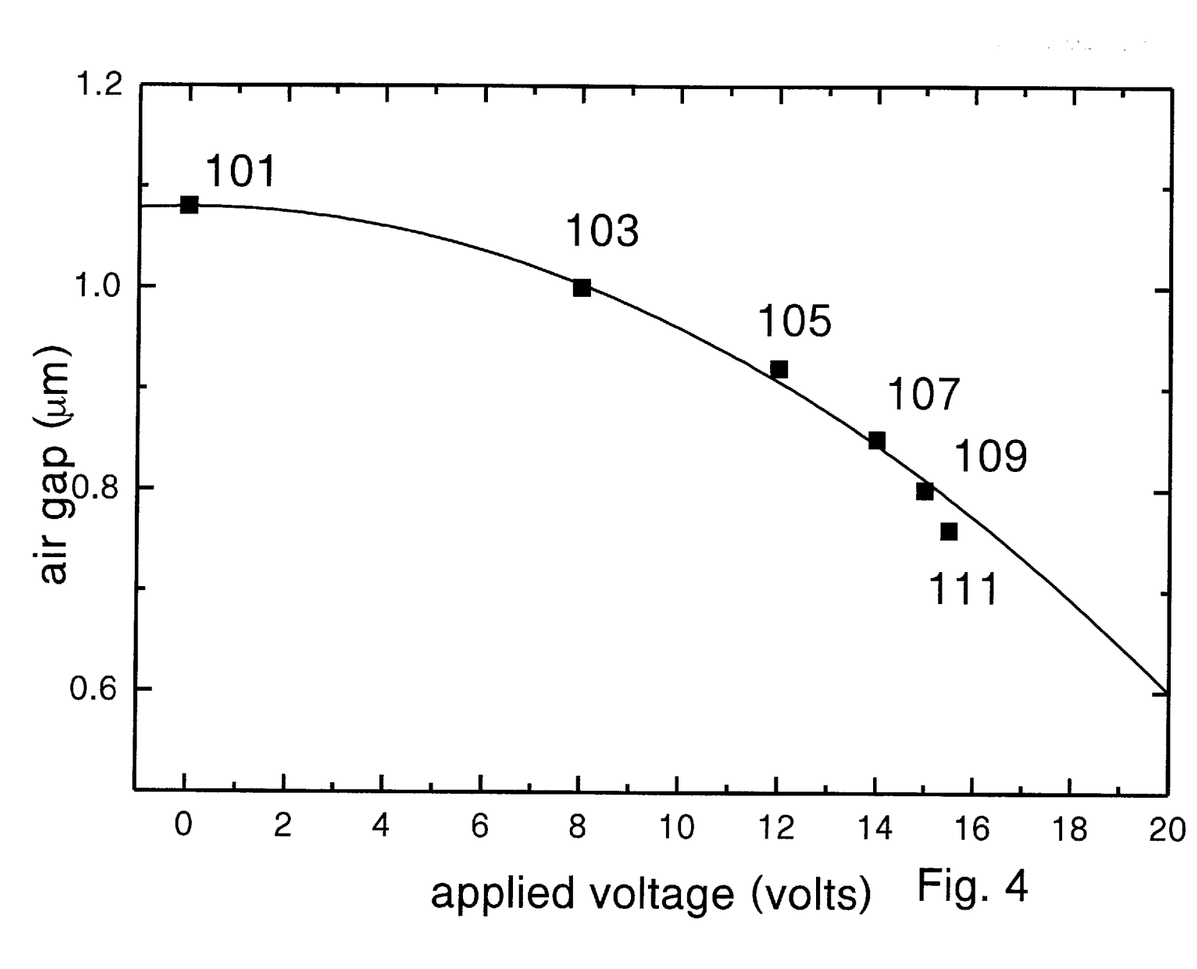
FIG. 4 is a plot of gap versus applied voltage.

It has been determined empirically that for moderate applied voltages, the modulator gap 20 follows a quadratic decrease with voltage, which can be expressed as:

$$d = d_o - aV^2, \qquad [1]$$

where: d is the size of the in the gap applied bias, $d_o$ is the size of the gap in the unbiased state of the modulator and a is a constant. The constant "a" can be expressed as $\lambda/4(1/V')^2$, where V' is the voltage required to change the gap 20 by $\lambda/4$. Expression [1], including experimental data points 101, 103, 105, 107, 109 and 111, are plotted in FIG. 4 for $\lambda$ equals 1.55 microns.

Figure 5:
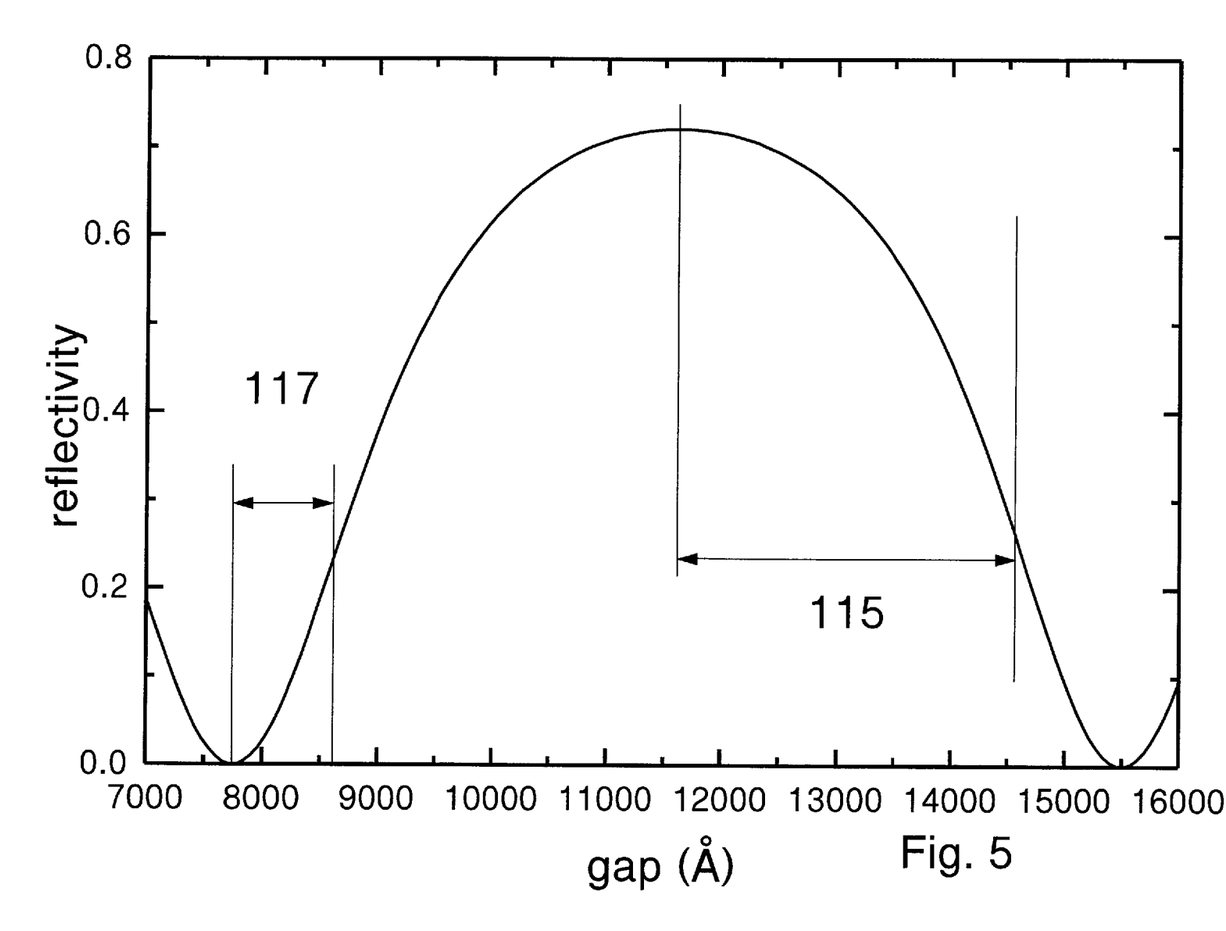
FIG. 5 is a plot of modulator reflectivity versus gap.

As dictated by expression [1] and as illustrated in FIG. 4, the gap 20 changes more rapidly for higher applied voltages. Thus, to increase the linearity of the reflectivity versus applied voltage response, $d_o$ should be set so that incremental changes in modulator reflectivity decrease with an incremental decrease in the size of the gap 20. FIG. 5 is a graphical representation of expression [2] below, which gives the relationship between modulator reflectivity and the gap 20:

$$R = 1 - 1/(1 + F \sin^2 \delta), \quad [2]$$

where: $\delta = 2\pi(d - d_z)/\lambda$, $d_z$ is the gap 20 resulting in zero reflectivity, $\lambda$ is the wavelength of the optical signal being modulated and F is the finesse. The finesse for the modulators described herein is a function of the reflectivity of the substrate 10:

$$F = (n_s^2 - 1)^2/(4n_s^2), \quad [3]$$

where: $n_s$ is the refractive index of the substrate 10. Expression [2] is the usual relationship for a Fabry-Perot etalon. FIG. 5 is based on $\lambda$ equals 1.55 microns. Expressions [1]–[3] are well known to those skilled in the art. See, for example, Macleod, H. A., *Thin-Film Optical Filters*, p. 159, (Adam Hilger, Ltd., U.K., 1986).

In regions 115 and 117 of operating curve shown in FIG. 5, incremental changes in modulator reflectivity decrease with an incremental decrease in the size of the gap 20. In region 115, the gap 20 decreases in size from about 14,575 angstroms to about 11,625 angstroms, while modulator reflectivity approaches a maximum. In region 117, the gap 20 decreases in size from about 8650 to 7750 angstroms, while modulator reflectivity approaches a minimum. It is, however, undesirable to operate the modulator in region 117 since modulator reflectivity is low. Operating in such a regime results in significant optical losses. To minimize such losses, the modulator should be operated so that reflectivity is rising as the gap 20 decreases, such as occurs in region 115.

Thus, the preferred design of a modulator 1 according to the present invention satisfies the following two requirements. The incremental change in reflectivity decreases with an incremental decrease in gap size. This requirement compensates for the increasing rate of change in gap size as the drive voltage increases. Second, modulator reflectivity increases as the size of the gap 20 decreases. This minimizes signal losses.

Figure 6:
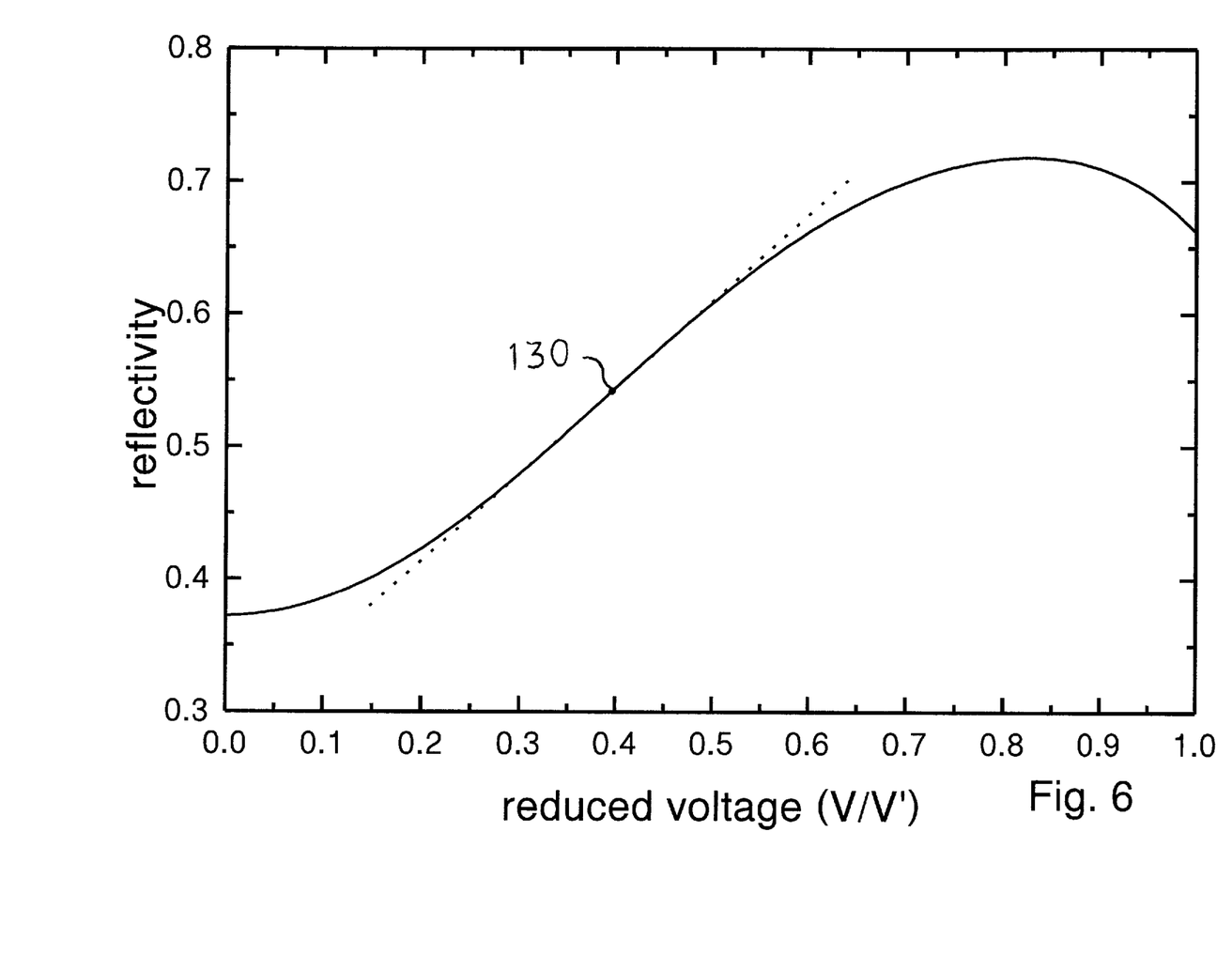
FIG. 6 is a plot of modulator reflectivity versus reduced applied voltage.

Expressions [1] and [2] can be combined to express reflectivity as a function of applied voltage:

$$R = 1 - 1/(1 + F \sin^2[\delta_o - \pi/2(V/V')^2]) \quad [4]$$

where: $\delta_o = 2\pi(d_o - d_z)/\lambda$. Expression [4] is shown graphically in FIG. 6, where reflectivity is expressed as a function of the reduced voltage, (V/V').

Figure 7:
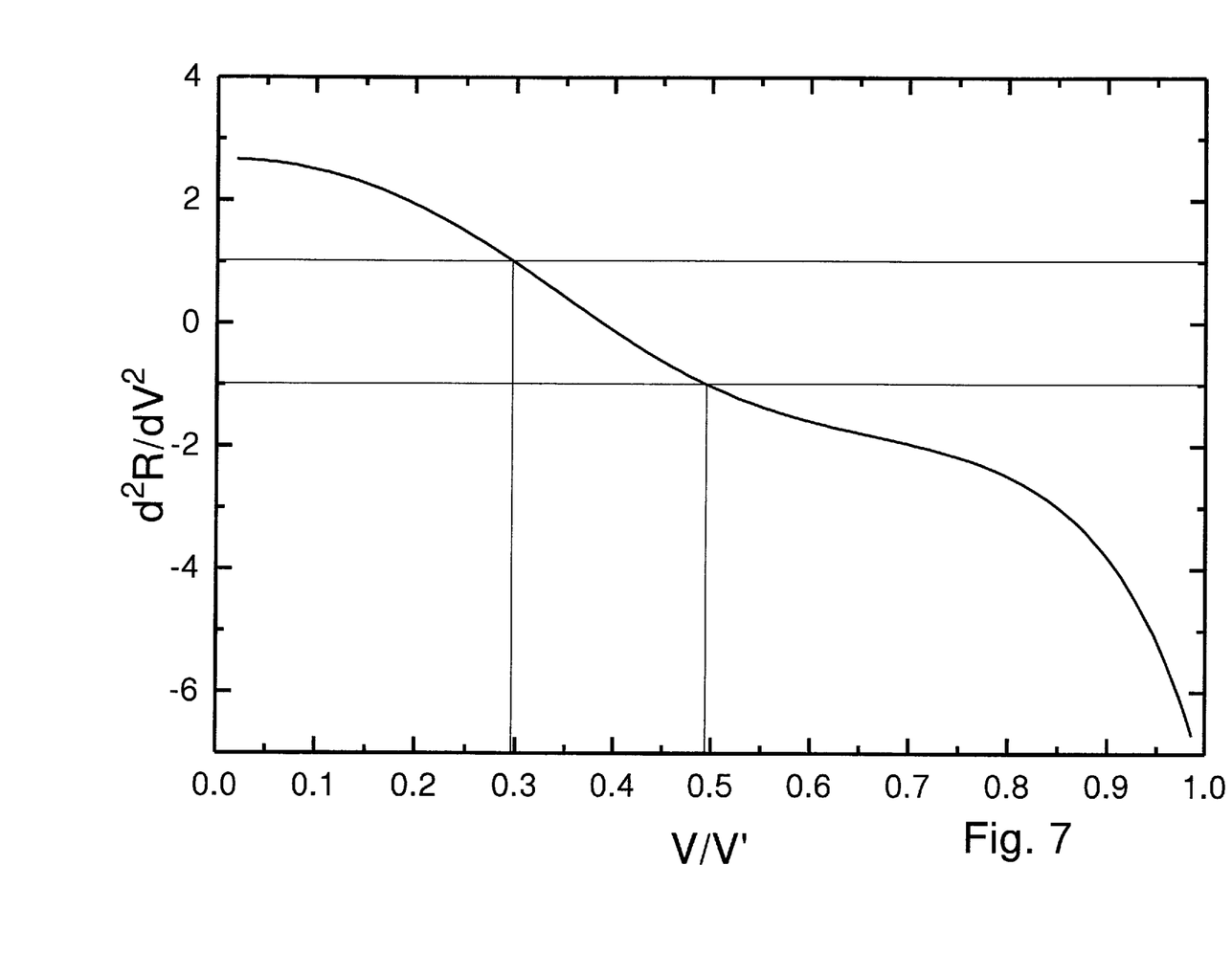
FIG. 7 is a plot of the second derivative the relation of FIG. 6.

A relation, or a portion thereof, is linear at points at which its second derivative equals zero. As such, a substantially linear operating region can be defined using the second derivative, $d^2R/dV^2$, of expression [4], the reflectivity versus voltage relation. This expression is shown graphically in FIG. 7.

A "nonlinearity" threshold is applied to the second derivative; for example, $-1 < d^2R/dV^2 < +1$, so that values of the second derivative betweeen the threshold values define, in terms of an applied voltage, a substantially linear operating range. The reflectivity of the modulator at the threshold values is determined from the reflectivity versus applied bias relation, expression [4]. A linear operating range is defined as the reflectivity at the positive threshold minus the reflectivity at the negative threshold. For example, if the linearity thresholds are defined as $-1 < d^2R/dV^2 < 1$, then, from the plot of $d^2R/dV^2$ vs. V/V', (V/V') at $-1$ equals about 0.297 and (V/V') at 1 equals about 0.495. From FIG. 6, modulator reflectivities at those values of V/V' are about 47.5 percent and 60.5 percent, respectively. Thus, the linear reflectivity range is about (60.5–47.5)=13 percent. This figure indicates that the reflectivity versus applied voltage characteristic is linear over thirteen percent of the change of the absolute reflectivity.

As indicated by expression [4], modulator reflectivity is a function of several parameters, including, in particular, the size of the gap 20 in the unbiased position and the refractive index, $n_s$, of the substrate 10. Thus, the linear operating range is maximized by appropriately selecting the size of the unbiased gap, and will vary as a function of $n_s$. Optimum unbiased gap size is determined by expressing the linear reflectivity range determined above as a function of the difference between the unbiased gap and the gap for zero reflectivity, as described below.

Figure 8:
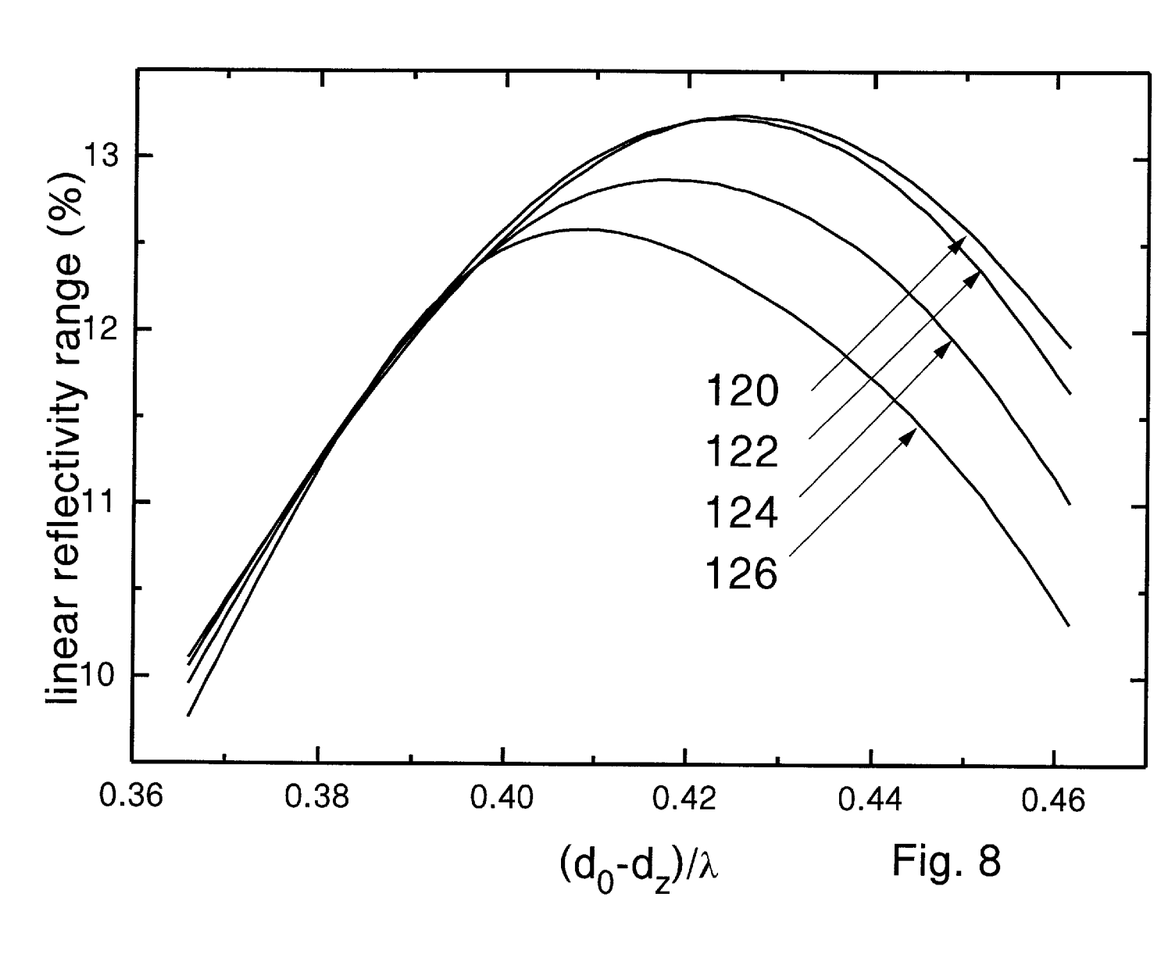
FIG. 8 is a plot of linear reflectivity range versus $(d_o - d_z)/\lambda$.

In FIG. 8, the linear reflectivity range is plotted as a function of $d_o - d_z/\lambda$ for a range of values of the refractive index, $n_s$, of the substrate 10. The refractive index of most materials suitable for use as the substrate 10 in micromechanical modulators to which the present invention applies have refractive indices in the range from about 2.5 to 4. Curves 120, 122, 124 and 126, correspond, respectively, to an $n_s$ of 2.5, 3.0, 3.5 and 4.0. The value of $d_o - d_z$ corresponding to the maximum value of the linear reflectivity range can be determined from the plot.

At $n_s = 3.5$, typical for silicon substrates, the maximum value of the linear reflectivity range occurs at $d_o - d_z$ equals about $0.419\lambda$. Since the gap at minimum reflectivity, $d_z$, equals $\lambda/2$, $d_o$ is therefore about $0.919\lambda$. For $n_s$ equals 2.5, 3.0 and 4.0, $d_o - d_z$ is approximately equal to, respectively, $0.426\lambda$, $0.423\lambda$ and $0.406\lambda$. Thus, the optimum value of $d_o$ for $n_s$ equals 2.5, 3.0 and 4.0, is about $0.926\lambda$, $0.923\lambda$ and $0.906\lambda$, respectively. The value of V/V' at the nonlinearity thresholds for the optimum value of the unbiased gap 20 sets the operating range for the modulator.

The foregoing description concerning the optimum size of the unbiased gap applies to modulators in which the refractive index of the membrane layer 15b is about equal to the square root of the refractive index of the substrate and in which the membrane layer 15b has a thickness equal to about one-quarter of a wavelength, $\lambda$, of the optical signal. It should be understood that the present method is readily applicable to other modulators for which these relations do not apply. For such other modulators, the phase of the reflectivity of the membrane will differ, relative to the present modulators, so that the reflectivity versus gap curve would be shifted relative to its position for $n_m = (n_s)^{0.5}$ and membrane thickness equals $\lambda/4$.

The optical modulator 1 can be formed using standard photolithographic processing techniques, as follows. The substrate 10, which may be in the form of a wafer, is preferably doped with phosphorous or boron. A sacrificial layer of erodible material is deposited upon the substrate 10. The erodible material is selected so that a suitable wet etch will erode this material at a much greater rate than any of the other layers that comprise the modulator 1. Suitable erodible materials include, without limitation, phospho-silicate glass (PSG), silicon dioxide and aluminum. The sacrificial layer is deposited to a thickness equivalent to size of the gap 20 when the modulator is quiescent, that is, when no voltage is applied.

The one or more layers comprising the membrane 15 are then deposited. First, a layer for forming the membrane layer 15b is deposited, preferably to a thickness of $\lambda/4$, as measured in the layer, on the sacrificial layer. If the membrane 15 will include the optional layer 15a, then a layer for forming the layer 15a is deposited on the layer 15b, to a desired thickness, typically $\lambda/4$. The thickness of the layers can vary according to particular modulator design being implemented. The layer that forms the membrane layer 15b is deposited under conditions appropriate for tailoring its refractive index as necessary. Such conditions are known to those skilled in the art. The aforementioned layers are then patterned according to well known photolithographic techniques to define the various features of the modulator 1, such as the nonconductive support layer 12, the membrane layers 15a and 15b, and, in some embodiments, support arms 25.

Further description of exemplary fabrication methods generally suitable for use in making the present modulator are disclosed in U.S. Pat. Nos. 5,500,761; 5,636,052; 5,654,819; 5,589,974; 5,659,418; and in patent applications Ser. No. 578,123 filed Dec. 26, 1995, Ser. No. and Ser. No. 08/565,453 filed Feb. 1, 1996, all of which are assigned to the present assignee. It will be appreciated that, depending upon the embodiment, the methods described in the aforementioned patent and patent applications may have to be modified for the present modulator. Such modifications are within the capabilities of those skilled in the art. For example, the size of the gap 20 in the "voltage applied" and unbiased state should be determined according to the present teachings, and the modulator fabricated accordingly. In particular, as will be appreciated by those skilled in the art, the tension in the membrane, the size of the unbiased gap and the like must be appropriately selected so that the modulator suitably operates within the linear operating regime for convenient voltages.

A modulator 1 according to the present invention operates as follows. A voltage is applied to the modulator to move the membrane to and within the linear operating regime. The voltage applied to the modulator is the sum of a constant bias, i.e., d.c. voltage, and a signal from an analog source, such as, without limitation, a cable network, a standard telephone network, a radio network and the like. The constant bias is selected so that, when such bias is applied, the membrane 15 will move to a position defined by the location of an inflection point of the reflectivity versus voltage relation. The inflection point is identified by the reference numeral 130 in FIG. 6. The inflection point, such as the inflection point 130, is taken to be the center of the linear operating range of the modulator 1. As described previously, the linear operating range is determined by the value of V/V' at the nonlinearity thresholds at the optimum size of the unbiased gap. The amplitude of the signal provided by the analog source is adjusted, as required, so that it remains within the linear operating range of the modulator. Thus, if the linear operating range varies from 0.3 to 0.5, the constant bias is 0.4 V/V', and the allowable range in the amplitude of the signal from the analog source is −0.10 to +0.10 V/V'.

Figure 9:
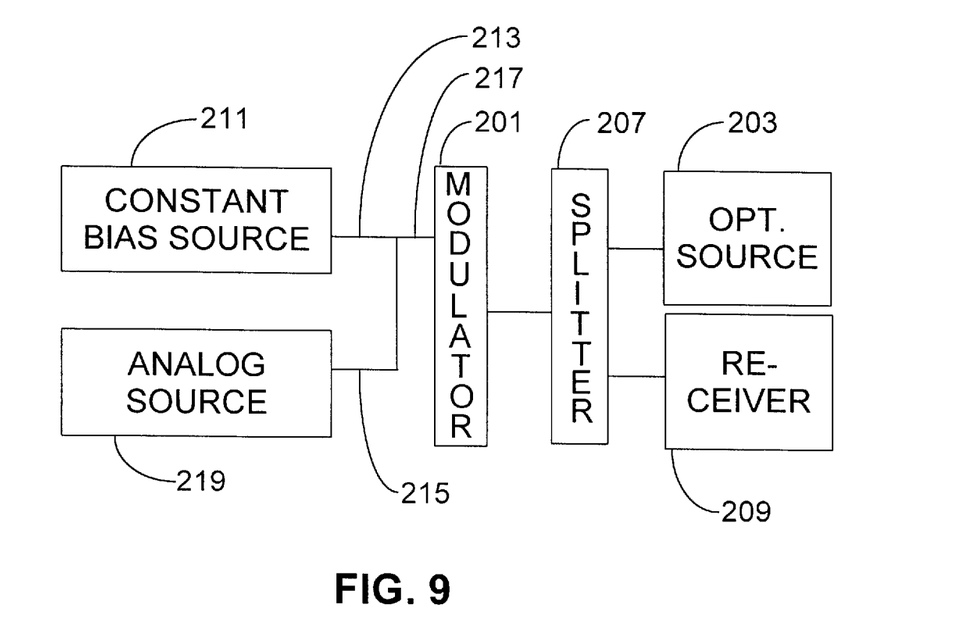
FIG. 9 is an illustration of an exemplary analog communications system using a modulator according to the present invention.

Optical modulators according to the present invention can be advantageously used in conjunction with various analog communications systems, as shown in FIG. 9. The system 200 comprises an optical source 203 in optical communication with a modulator 201 through an optical splitter 207. The optical source supplies an optical signal 204 to the modulator 201. The modulator 201 is further in optical communication with a receiver 209 via the splitter 207.

The modulator 201 receives a signal 217 which is the sum of the contribution of a first and a second signal, 213 and 215, respectively. The first signal 213 is a constant bias delivered by a constant bias source 211, such as a battery. The constant bias is predetermined, as described above, to move the modulator's membrane to a position at the center of the linear operating range. The second signal 215, which is smaller in amplitude than the signal 213, is delivered from an analog source 219, such as, for example, a radio network, cable television network, or standard telephone network. The amplitude of the second signal 215 is adjusted, as required, so that the signal 217 to the modulator 201 will remain within the linear operating range. The second signal 215 can be adjusted at its source or by appropriate electronics located downstream with the modulator 201.

When maintained within the linear operating range, the reflectivity of the modulator 201 changes substantially linearly with the signal 217. Thus, the signal 215 is faithfully encoded on to the optical signal 204. The modulator returns encoded signal 205, which is sent to the receiver 209 via the splitter 207.

Although a number of specific embodiments of this invention have been shown and described herein, it is to be understood that such embodiments are merely illustrative of the many possible specific arrangements that can be devised in application of the principles of this invention. Numerous and varied other arrangements can be devised in accordance with these principles by those of ordinary skill in the art without departing from the scope and the spirit of the invention.

I claim:

1. A micromechanical optical modulator for modulating an optical signal characterized by a wavelength, the modulator physically adapted for operating in a linear operating regime wherein there is a substantially linear change in reflectivity with a change in an applied voltage, comprising:

a substrate; and a movable layer in a spaced and superposed relation to the substrate defining a gap, the movable layer having a first position and the gap having a first size in the absence of the applied voltage, wherein, movement of the movable layer results in a change in size of the gap causing the reflectivity to change; and further wherein the movable layer moves to and within the linear operating regime under the applied voltage, and the physical adaptations include selecting the first membrane position and the linear operating regime so that (a) as the movable layer moves within the linear operating regime, incremental changes in reflectivity decrease with incremental decreases in the gap size; and (b) as the movable layer moves from the first position to the linear operating regime, reflectivity increases.

2. The modulator of claim 1 wherein the applied voltage comprises a first constant signal having a first constant amplitude and a second signal having a second varying amplitude.

3. The modulator of claim 2 wherein the first constant amplitude of the first signal corresponds to an inflection point of a reflectivity versus voltage relation of the modulator.

4. The method of claim 2 wherein the first constant amplitude is selected to move the movable layer to a mid point of the linear operating regime.

5. The method of claim 4 wherein the first position is selected to maximize the linear operating regime.

6. The modulator of claim 4 wherein the substrate is characterized by a first refractive index in the range of about 2.5 to about 4 and the movable layer is characterized by a second refractive index that is about equal to the square root of the first refractive index, and further wherein the first size of the gap is in the range of about 0.906 to about 0.926 times the wavelength of the optical signal, as a function of the first refractive index.

7. The modulator of claim 6 wherein the mid-point of the linear operating regime is about equal to 0.395 times the wavelength of the optical signal.

8. The modulator of claim 1 wherein the substrate is characterized by a first refractive index of about 3.5 and the movable layer is characterized by a second refractive index that is about equal to the square root of the first refractive index, and further wherein the first size of the gap is about equal to 0.919 times the wavelength of the optical signal.

9. The method of claim 8 wherein the substrate is silicon.

10. The method of claim 8 wherein the movable layer comprises at least one layer of material, and the one layer is silicon nitride.

11. A method for forming a micromechanical optical modulator for modulating an optical signal characterized by a wavelength, the modulator including a movable membrane suspended above a substrate defining a gap therebetween, the membrane having a first position in which the gap has a first size, and the membrane movable to and within a linear operating regime wherein modulator reflectivity changes in a substantially linear manner with a change in an applied voltage, comprising the steps of:

(A) determining the first size of the gap by
  (i) defining a relationship between reflectivity and gap;
  (ii) defining a relationship between reflectivity and applied voltage;
  (iii) taking a second derivative of the relationship determined in step (ii), and defining a range wherein the relationship of step (ii) is substantially linear by setting a first negative and a second positive threshold value of the second derivative, wherein values of the second derivative within the threshold values define the substantially linear range;
  (iv) determining a linear reflectivity range by determining a first and a second applied voltage at the threshold values, determining first and second reflectivity values corresponding to the first and second applied voltages using the relationship of step (ii), and substracting the first reflectivity from the second reflectivity;
  (v) expressing the range of step (iv) as a function of the difference, $d_o-d_z$, between the first size of the gap and gap size at the relative reflectivity minima; and
  (v) determining the value of the difference $d_o-d_z$ corresponding to a maximum value of the linear reflectivity range, and solving for $d_o$ knowing $d_z$;

(B) forming a support on the substrate, the support for suspending the membrane in the first position above the substrate, wherein the support is formed so that first size of the gap is equal to $d_o$.

12. A method for forming a micromechanical optical modulator for modulating an optical signal characterized by a wavelength, the modulator including a movable membrane suspended above a substrate defining a gap therebetween, the membrane having a first position in which the gap has a first size, and the membrane movable to and within a linear operating regime wherein reflectivity changes in a substantially linear manner with a change in an applied voltage, and the substrate characterized by a first refractive index in the range of 2.5 to 4, comprising the steps of:

(A) forming a support on the substrate, the support for positioning the membrane in the first position, wherein the support is formed so that the first size of the gap is in the range of 0.906 to 0.926 times the wavelength of the optical signal; and (B) forming the membrane on the support, wherein the membrane is formed so that it is flexible and has at least one layer having a second refractive index that is about equal to the square root of the first refractive index and having a thickness of about one-quarter of the wavelength of the optical signal.

13. The method of claim 12 wherein step (A) further comprises forming a support on a silicon substrate having a first refractive index of about 3.5, and forming the support so that the first size of the gap is about equal to 0.919 times the wavelength of the optical signal.

14. A method for operating a micromechanical optical modulator, the modulator having a movable membrane, comprising the steps of:

determining a range of voltage, wherein voltages within the range have amplitudes suitable for moving the movable membrane to, and keeping the movable membrane substantially within, a linear operating regime; and applying a first signal to the modulator, the first signal having a voltage within the determined range and characterized by a first amplitude, wherein, in the linear operating range, modulator reflectivity changes in a substantially linear manner with a change in applied voltage.

15. The method of claim 14 wherein the step of applying the first signal further comprises applying a second signal having a second amplitude and a third signal having a third amplitude, wherein, the second and the third signals are applied in series so that the first amplitude is the sum of the second and the third amplitudes.

16. The method of claim 15 wherein the second signal is a constant bias and the third signal originates from an analog source.

17. The method of claim 16 wherein the step of determining a range of voltage further comprises determining the second amplitude of the second signal such that, in response to the application of a voltage having the second amplitude, the movable membrane moves to about a midpoint of the linear operating regime.

18. The method of claim 17 wherein the step of determining a range of voltage further comprises determining the third amplitude of the third signal so that the membrane moves substantially within the linear operating regime.

19. A communications network comprising:

a modulator for modulating an optical signal, the modulator operating within a linear operating regime wherein there is a substantially linear change in reflectivity with a change in a first voltage applied to the modulator so that the reflectivity tracks the amplitude of the first voltage, the first voltage comprising a second constant bias and a third communications signal;

an optical source in optical communication with the modulator, the optical source for providing the optical signal to the modulator;

an communications signal source for providing the third communications signal;

a bias source for providing the second constant bias; and, a receiver in optical communication with the modulator, the receiver for receiving a portion of the modulated optical signal from the modulator.

20. The communications network of claim 19, further comprising a splitter, wherein the splitter delivers the optical signal provided by the optical source to the modulator, and further wherein the splitter delivers the portion of the modulated optical signal from the modulator to the receiver.

21. The communications network of claim 19 wherein the communications signal source is selected from the group consisting of a radio network, a cable television network and a standard telephone network.

\* \* \* \* \*